US008458164B2

(12) United States Patent
Payton et al.

(10) Patent No.: US 8,458,164 B2
(45) Date of Patent: Jun. 4, 2013

(54) QUERY MODEL TOOL AND METHOD FOR VISUALLY GROUPING AND UNGROUPING PREDICATES

(75) Inventors: Brian G. Payton, San Jose, CA (US); Stavros Polyviou, Yeri (CY); Maria N. Scanlon, Morgan Hill, CA (US); Sheila I. Sholars, Morgan Hill, CA (US); Andrew Speakes, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1516 days.

(21) Appl. No.: 10/620,857

(22) Filed: Jul. 15, 2003

(65) Prior Publication Data
US 2005/0015364 A1   Jan. 20, 2005

(51) Int. Cl.
*G06F 17/30* (2006.01)
(52) U.S. Cl.
USPC ........... 707/713; 707/722; 707/736; 707/758; 707/781; 707/791
(58) Field of Classification Search
USPC ......................................... 707/3–5, 600–899
See application file for complete search history.

(56) References Cited

U.S. PATENT DOCUMENTS

| 5,289,567 A | 2/1994 | Roth |
| 5,418,950 A | 5/1995 | Li et al. |
| 5,421,008 A * | 5/1995 | Banning et al. ................... 707/4 |
| 5,428,737 A | 6/1995 | Li et al. ......................... 395/161 |
| 5,471,613 A | 11/1995 | Banning et al. |
| 5,504,885 A | 4/1996 | Alashqur |
| 5,566,330 A | 10/1996 | Sheffield |
| 5,577,241 A | 11/1996 | Spencer |
| 5,664,182 A | 9/1997 | Nierenberg et al. |
| 5,701,456 A | 12/1997 | Jacopi et al. |
| 5,721,897 A | 2/1998 | Rubinstein |
| 5,721,900 A * | 2/1998 | Banning et al. ................... 707/4 |
| 5,767,849 A | 6/1998 | Borgendale et al. |
| 5,781,720 A | 7/1998 | Parker et al. |
| 5,787,418 A | 7/1998 | Hibbetts et al. |
| 5,826,258 A | 10/1998 | Gupta et al. |
| 5,832,481 A | 11/1998 | Sheffield |
| 5,842,209 A | 11/1998 | Mocek et al. |
| 5,924,089 A | 7/1999 | Mocek et al. |
| 6,016,488 A | 1/2000 | Bosworth et al. |
| 6,047,284 A | 4/2000 | Owens et al. |
| 6,226,785 B1 | 5/2001 | Peterson et al. |

(Continued)

OTHER PUBLICATIONS

Murray et al (NPL: "Kaleidoquery: A Visual Query Language for Object Databases", ACM Press 1998, New York, NY, USA).*

(Continued)

*Primary Examiner* — Isaac M Woo
(74) *Attorney, Agent, or Firm* — Sawyer Law Group, P.C.

(57) ABSTRACT

A user-friendly query modeling tool and method, for representing, creating, modifying and modeling a query language statement for use in retrieving data from a database. In accordance with the present invention, the tool includes a user interface for receiving or building and manipulating a query, a query model definition for use in populating instances of one or more query models, and a model content provider for receiving query elements from the user interface and providing them to the query model, and conversely, for retrieving query elements from the query model and providing them to the user interface. The user interface enables the user to easily group and ungroup query elements by providing a visual tool for selecting query elements to be grouped and ungrouped.

48 Claims, 12 Drawing Sheets

U.S. PATENT DOCUMENTS

| | | | |
|---|---|---|---|
| 6,279,008 | B1 | 8/2001 | Tung Ng et al. |
| 6,282,537 | B1 | 8/2001 | Madnick et al. |
| 6,496,833 | B1 | 12/2002 | Goldberg et al. |
| 6,535,873 | B1 | 3/2003 | Fagan et al. |
| 6,581,054 | B1 | 6/2003 | Bogrett |
| 6,775,662 | B1 | 8/2004 | Witkowski et al. ............... 707/3 |
| 6,826,557 | B1 | 11/2004 | Carter et al. |
| 7,032,071 | B2 | 4/2006 | Hand et al. |
| 2001/0016843 | A1 | 8/2001 | Olson et al. |
| 2001/0034733 | A1 | 10/2001 | Prompt et al. |
| 2002/0049863 | A1 | 4/2002 | Kappel et al. |
| 2002/0198876 | A1 | 12/2002 | Zielinski et al. |
| 2003/0037039 | A1 | 2/2003 | Mah et al. ......................... 707/1 |
| 2003/0195880 | A1 | 10/2003 | Mancinelli |
| 2004/0034846 | A1 | 2/2004 | Ortal et al. |
| 2005/0004911 | A1* | 1/2005 | Goldberg et al. ................ 707/7 |
| 2005/0076311 | A1 | 4/2005 | Kusterer et al. |
| 2005/0144163 | A1 | 6/2005 | Tang et al. |

OTHER PUBLICATIONS

King et al., Designing Database Interfaces with DBface, ACM Transaction on Information Systems, ACM Press, Apr. 1993, pp. 105-132, vol. 11, No. 2.

Pizano et al., Automatic Generation of Graphical User Interfaces for Interactive Database Applications, Conference on Information and Knowledge Management, Proceedings of the Second International Conference on Information and Knowledge Management, ACM Press 1993, pp. 344-355.

Alex Jarzebowicz, Sheila Sholars, Brian Payton "Creating SQL Queries the Easy Way with SQL Assist for DB2 UDB Version 8.1", Nov. 6, 2002.

King, et al., "Designing Database Interfaces with DBface, ACM Transaction on Information Systems," ACM Press, Apr. 1993, vol. 11, No. 2, pp. 105-132.

Pizano, et al., "Automatic Generation of Graphical User Interfaces for Interactive Database Applications," Conference on Information and Knowledge Management, Proceedings of the Second International Conference on Information and Knowledge Management, ACM Press 1993, pp. 344-355.

Murray, et al., "Kaleidoquery: A Visual Query Language for Object Databases," ACM Press 1998, New York, NY, pp. 247-257.

* cited by examiner

QUERY MODEL TOOL AND METHOD FOR VISUALLY GROUPING AND UNGROUPING PREDICATES

CROSS-REFERENCE TO RELATED APPLICATIONS

The present application is related to the following patent applications which are commonly assigned and filed on the same day, Jul. 15, 2003: application Ser. No. 10/620,538, entitled "Model Content Provider With Reusable Components for Supporting a Plurality of GUI API's"; application Ser. No. 10/620,633, entitled "Query Modeling Tool Having Dynamically Adaptive Interface"; and application Ser. No. 10/620,856, entitled "A Method and Structure for Representing Complex Query Elements in a Modelling Tool."

FIELD OF THE INVENTION

This invention relates in general to database management systems performed by computers, and in particular, an interactive tool and method for graphically representing, creating, modifying and modeling structured language queries.

BACKGROUND OF THE INVENTION

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage. Data stored in a database is selectively retrieved using a database query.

The data from a relational database is commonly retrieved using a Structured Query language (SQL) interface which is well known in the art. The SQL interface has been adopted as such by both the American Nationals Standard Organization (ANSI) and the International Standards Organization (ISO), and allows users to formulate relational operations on the tables interactively, in batch files, or embedded in host languages such as C, COBOL, etc. Operators are provided in SQL that allow the user to manipulate the data, wherein each operator operates on one or more tables and produces a new table as a result.

Query languages such as SQL require some expertise to write effectively. Since both users and applications heavily rely on query statements for retrieving information, tools have been developed to assist in the creation of query statements. These tools include a user interface for creating the initial query, and a query model for storing the components of the resulting query in a manner that enables their reconstruction. Once completed, the query is forwarded to the database management system for performing selective data access.

Query tools suffer from numerous shortcomings that have highlighted a need for a more useful and user-friendly query building tool. The assistance they provide is limited to basic query syntax, requiring manual input of more complex queries. Further, while existing query tools enable creation and modification of new query statements, they do not generally provide means for populating the interface and underlying model with existing query statements to enable modification of those statements.

Other shortcomings exist in the query models themselves. For example, existing models provide limited representation of complex query elements in formats that are not readily understandable to the developer. Moreover, they do not provide much flexibility for reconstructing the query and its subelements. In addition, they are often dependent upon the format of a particular user-interface and do not lend themselves well to use by graphical user interfaces of different formats.

SUMMARY OF THE INVENTION

In response to the shortcomings of prior query generating tools, the present invention is directed to a user-friendly interactive system and method for representing, creating, modifying and modeling a query language statement for use in retrieving data from a database. According to the system and method of the present invention, a tool is provided that includes an interactive graphical user interface for inputting, creating, and modifying database query statements. The tool further provides an application interface for enabling receipt and manipulation of existing query statements. A modeling schema is defined for storing the query statement elements. The modeling schema provides a high granularity, meaningful representation of complex query elements reflective of the query syntax. As one aspect of the invention, the modeling schema reflects multiple dialects of the query language by representing element types and subtypes from all dialects considered in creating the schema. In a further aspect of the invention, the granularity of the modeling schema enables reconstruction of the query statement or any element thereof with a single call to a node representative of that element. The call returns not only the element represented by the node, but also all elements represented by subnodes of the node.

In one aspect of the invention, queries can be built directly by a user through a user-interface, or by an application through an application programming interface.

In another aspect of the present invention, the interface and model may be populated by newly created query statements, existing query statements, or both.

In a further aspect of the invention, nested search conditions may be created and manipulated through the graphical user interface and the resulting query represented in an understandable manner.

In another aspect of the present invention, the interface is dynamically adaptive to the query element being constructed.

In another aspect of the present invention, any sub-element of a stored query statement may be reconstructed inclusive of all of its child elements.

In a further aspect of the present invention, the query model represents query elements that have historically been difficult to model in a granular and understandable fashion, such as group-by's, predicates, table references, value expressions and iterative and nested elements. In particular, the query model comprises atomic, hierarchical representations of all desired query elements, taking into account the various dialects of the query language, so that any incoming query can be stored within its schema.

In yet another aspect of the invention, a layer comprising a common set of generalized classes is provided between the user interface and the query model for use in retrieving data from the query model and populating user interfaces of different formats.

DETAILED DESCRIPTION

The present invention will now be described with reference to a specific embodiment. However, it will be understood that various modifications and equivalent substitutions may occur to an implementer of the tool described without parting from the spirit and scope of the invention. Accordingly, the invention is not intended to be limited in any manner by the specific embodiment, and each element described is intended to encompass all reasonable equivalents thereof.

I. System Architecture

Figure 1:
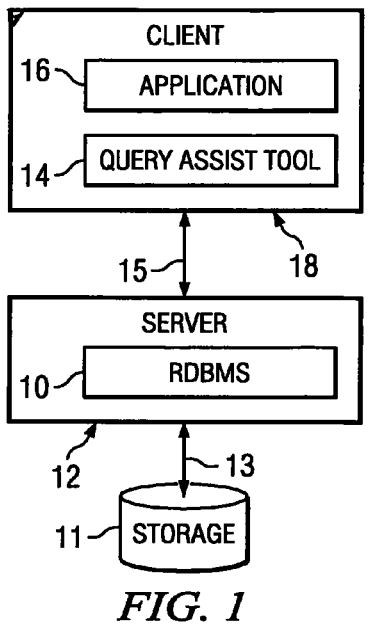
FIG. 1 is a simple block diagram of the Query Assist tool of the present invention.

FIG. 1 represents a system suitable for practicing the present invention. It includes relational database management system software (RDBMS) 10 residing in a server 12 and coupled to a data storage unit 11. The RDBMS 10 of the present invention is the IBM® DB2®, relational database product, although any relational database may be substituted. The server of the present invention may be, for example, IBM's UNIX-based pSeries™ server, Intel-based xSeries™ server, AS/400 based iSeries™ server, or OS/390 based zSeries™ mainframe running the compatible DB2 software. It may also be any hardware configuration capable of providing a suitable environment for running relational database software accessible by an application. The storage 11 may be any type of persistent storage such as an array of direct access storage devices, optical drives, holographic devices, tape, etc. and may be accessed via a network connection, SCSI bus, or other appropriate means 15. The RDBMS 10 of the detailed embodiment is accessed by application software 16 residing on a client workstation 18. Alternatively, it may run within the application space of a mainframe computer. The application software 16 makes requests to the RDBMS 10 for information and data over a connection 15 which may be, for example, an internet connection, a communications bus, or other appropriate accesses means. Requests for information and data are typically in the form of a relational database query statement sent over connection 15 to the RDBMS. The RDBMS parses the query statement for processing, and writes, modifies or retrieves data from storage 11 in accordance with the query statement's content. The query assist tool 14 of the present invention is software residing between the application software 16 and the RDBMS middleware 10. According to the detailed embodiment, it resides on client 18, but it may also reside on a separate machine such as the server 12, as long as it is accessible by the application 16, e.g. via a network or TCP/IP connection.

Figure 2:
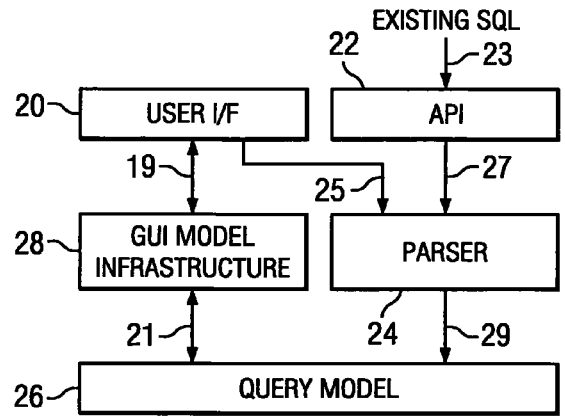
FIG. 2 is a block diagram illustrating the architecture of the Query Assist tool of the present invention.

FIG. 2 is a detailed block diagram representing the query assist tool 14 of FIG. 1. It includes a user interface 20 for assisting a user in creating and modifying a query statement, an application interface (API) 22 for receiving query statements such as embedded queries directly from an application, a parser 24, GUI model infrastructure 28 and a query model 26.

The user interface 20 may be incorporated into an application, thereby enhancing the application interface with query building capabilities. Alternatively, the interface may be part of a separate query building tool.

The application interface 22 is coupled to a parser 24, as represented by arrow 27. Parser 24 receives the query statement and decomposes it into subelements or model elements (objects) based on the parsing rules. The parsing rules include syntactic rules and semantic rules. The syntactic rules break down the query into syntactic elements that form the basis for creating a query model representation. The semantic rules enable the parser to create and relate the model objects according to the model definition. These semantic rules will be described in further detail subsequently. The parsed statement is then forwarded to a memory-based query model 26 for storage as represented by arrow 29. The parser 24 may also forward the model elements to the user interface 20. Consequently, queries received through API 22 may be modified via user interface 20.

Interface 20 also communicates with query model 26 via GUI model infrastructure 28, as represented by arrows 19 and 21. Interface 20 is designed to be consistent with the query model definition. Accordingly, when a query is created using interface 20, the interface creates and relates model elements that conform to the query model definition. The queries may be used to populate the model directly as represented by connection 21 without further parsing.

The user interface 20 may also include a query input allowing the user the option of typing in a query statement. Such queries are first sent through the parser 24 so that the model elements and relationships may be created in the same manner as queries received over API 22. In addition, the user interface of the present invention includes an expression builder which allows a user to type in complex sub-expressions. These sub-expressions are similarly passed to the parser over connection 25 prior to being stored in the query model 26.

II. User Interface

Figure 3D:
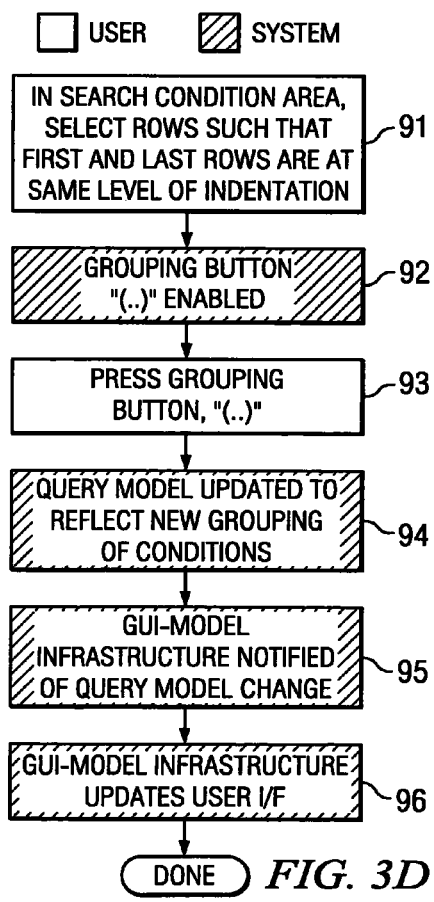
FIGS. 3C and 3D are flow diagrams representing user and system actions when using the interface of FIGS. 3A and 3B.
Figure 3C:
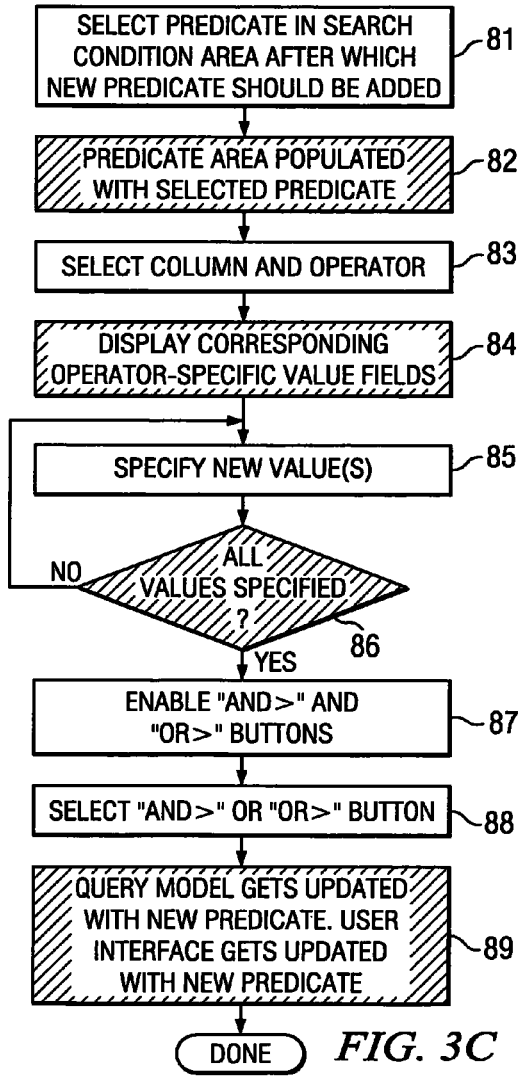
Figure 3A:
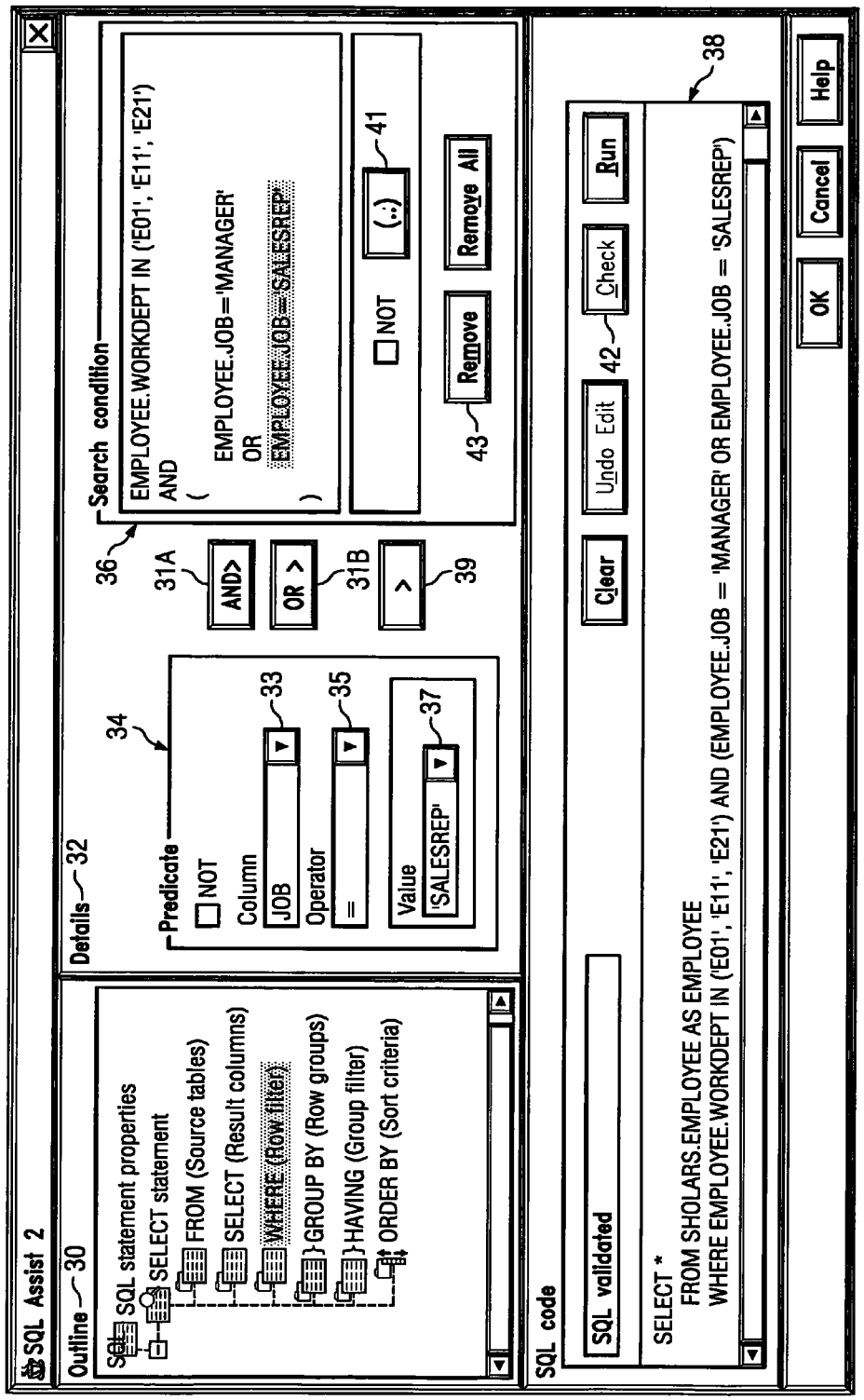
FIGS. 3A and 3B illustrate an exemplary user interface for use with the Query Assist tool of the present invention.
Figure 3B:
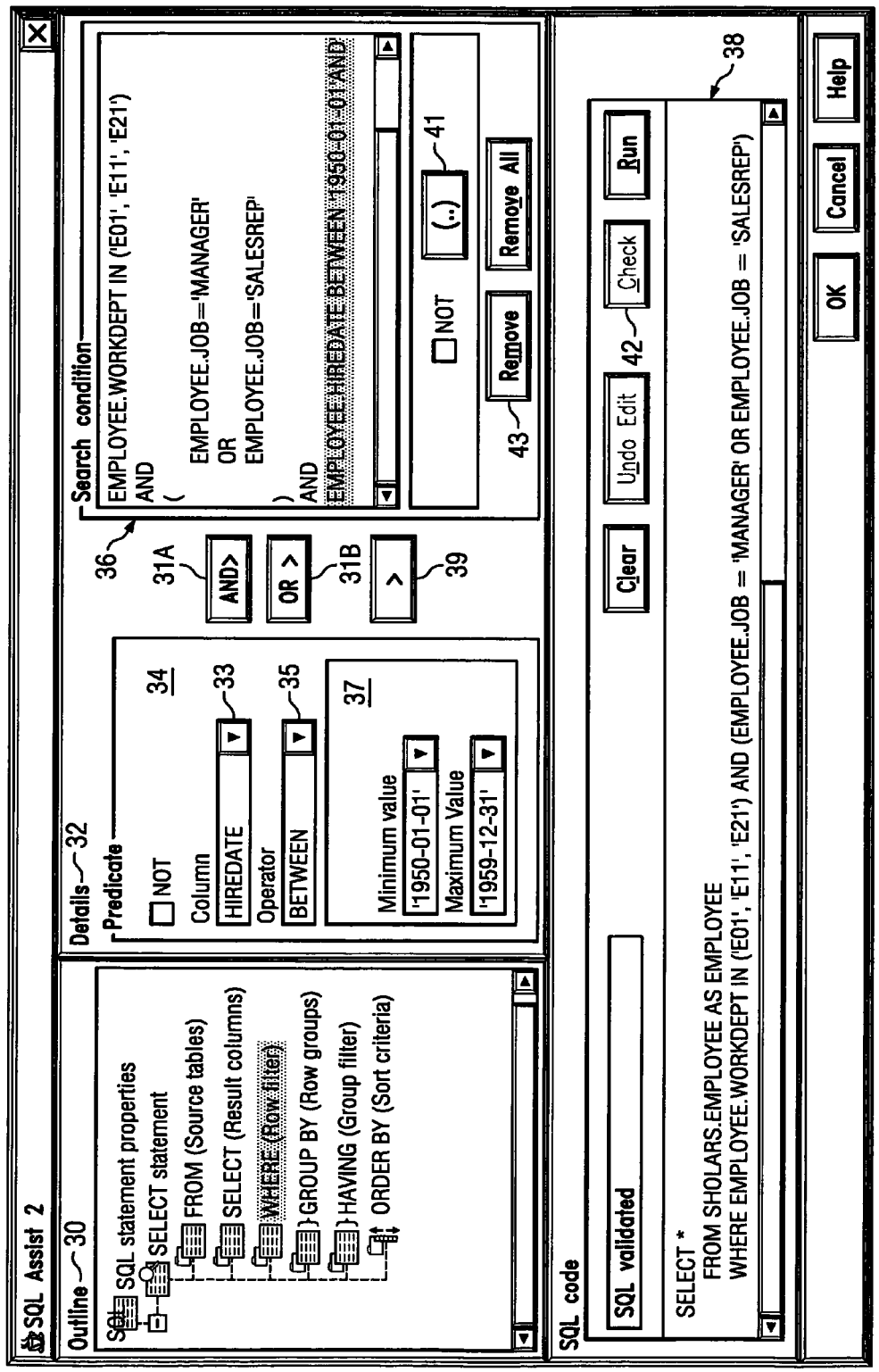

FIGS. 3A and 3B are screen captures of a user interface suitable for practicing the present invention. As persons familiar with database querying will appreciate, typical query comprises a SELECT-type clause having a format like the following:

SELECT column_list
FROM sourcetable_list
optional WHERE search_condition
optional GROUP BY columname_list HAVING search_condition
optional ORDER BY columname_list Although the interface of FIGS. 3A and 3B are illustrated with reference to the SQL syntax, it will be understood that the invention is not limited to queries written in SQL, but can be applied generally to any query language.

The interface portion of the query building tool may be implemented using any known interface generating tool or programming language such as, for example, Visual Basic or Java.

As illustrated in FIG. 3A, the query building tool of the present invention provides an interface for building a query by providing a set of display areas for specifying query elements. In a first OUTLINE region 30, elements of a query statement are represented in an outline format as shown. A general header is entitled "Statement Properties". Under this heading is a category entitled "SELECT statement", and all supported elements of a SELECT clause are listed as its subcategories, e.g., "FROM", "WHERE", "GROUP BY", "HAVING" and "ORDER BY". The user begins construction of a SELECT statement by opening the "Select statement" folder to display the subcategories. He then proceeds to select one of the displayed subcategories, e.g., by highlighting his selection with a mouse, and specifying the parameters of that subcategory in the input region 32 and/or 38.

Alternatively, the interface may be populated with an existing query statement stored in the underlying query model. This is achieved by each portion of the interface retrieving and displaying the elements of the underlying query model that are appropriate for that portion.

The "Details" section 32 enables the user to specify the parameters for his selected subcategory. The format of region 32 changes for each subcategory selection made in region 30. For example, if the user selects subcategory "FROM", the interface makes a call to the underlying database for a list of available source tables, and then displays these as selectable options. The user then selects from the displayed tables, e.g., by highlighting. Similarly, if the user selects the "SELECT" subcategory, the details region 32 displays the columns of the selected table(s) for further selection by the user. Selection of the "WHERE" subcategory causes the "Details" section to display a "Predicate" region 34 and a "Search Conditions" region 36 as shown.

The predicate region 34 allows the user to build one or more predicates by selecting an operator (AND, OR or NOT) using buttons 31A and 31B for connecting multiple predicates, a column name 33, a column operator 35, and an operator value 37, e.g. by pull down menu, field select or other comparable means. The resulting predicate is displayed in editing window 38 and "Search condition" window 36, described in more detail subsequently.

As an aspect of the present invention, the format of the value input area 35 in the predicate region 34 changes dynamically in response to selection of a column operator 35. For instance, in FIG. 3A the column operator selected is an equals sign (=). In response to that selection the screen definition is modified to display a single value pull down menu in region 37. The pull-down menu lists all possible values for the column name 33 "JOB" specified by the user.

Another example of the dynamic aspect of the predicate region 34 is shown in FIG. 3B. Here, the user has selected a column name 33 of "HIREDATE" from a list of possible options, and the "BETWEEN" column operator 35. In response, minimum and maximum value input regions are displayed in input area 37. The selectable minimum and maximum values represent all possible values of column "HIREDATE" 33.

When all predicate options have been specified in field 34, the user confirms his selection, e.g. by clicking his mouse on button 39. Confirmation causes the query model to be populated or updated with the new predicate as previously described. It also causes the new predicate to appear in search condition display area 36 and in "SQL code" editing window 38.

In the example of FIG. 3A, three user-specified search conditions are displayed in region 36: "EMPLOYEE.WORKDEPT IN ('E01', 'E11', 'E21')'"; "EMPLOYEE.JOB='MANAGER'"; and "EMPLOYEE.JOB='SALESREP'". They are connected by operators "AND" and "OR", respectively.

Another aspect of the present invention is the ability to group or nest predicates in region 36 to control the order in which they are evaluated. In FIG. 3A, the user has elected to group "EMPLOYEE.JOB='MANAGER'"; and "EMPLOYEE.JOB='SALESREP'", as indicated by the parenthesis around these predicates and their indentation with respect to the "EMPLOYEE.WORKDEPT IN ('E01', 'E11', 'E21')" predicate. Grouping is effected by highlighting the desired predicates in window 36 and then clicking on "(..)" button 41. The action of clicking on button 41 again causes the parenthesis and indentation, or similar indicia of grouping, to appear in window 36. It also causes the query model to be updated with the change to the displayed search condition. Grouped predicates may also be ungrouped by highlighting a set of grouped predicates and clicking on "Remove" button 43.

The grouping function described above is illustrated by flow diagram 3D. In a first step 91, the user select rows in search condition area 36 such that first and last rows are at same level of indentation. Such selection causes the grouping button 41 to be enabled, as shown in step 92, so that the user may activate it (step 93). Activation causes the query model 26 to be updated to reflect new grouping of conditions, as represented in step 94. The GUI-Model Infrastructure 28 is notified of query model change in step 95 and in response, GUI-Model Infrastructure 28 updates User I/F 20 as shown in step 96.

The Where Clause user interface design proved a challenging undertaking. The current design provides a tremendous amount of functionality masked by a simple and intuitive user interface. Many query builders do not support the full syntax of the Where Clause in the GUI due to the complex nature of this clause, and the inventors are not aware of any that provide the functionality of the present invention.

A Where Clause consists of a search condition that limits the number of rows the database will return after executing a SQL query. A search condition, which may be nested, consists of a set of predicates combined with logical operators. Each predicate, which may be negated, specifies a condition that may be true, false or unknown. There are many types of predicates that may be expressed using a different syntax for each.

The Where Clause user interface design of the present invention allows the user to build the search condition one predicate at a time. It allows for easy creation, insertion, nesting, negation and removal of predicates. It supports most of the different forms of predicates available. It allows the user to insert each predicate anywhere in the search condition.

To make the search condition more readable and understandable, the predicates are indented to show the level of nesting. This flexible design is not only applicable to a Where Clause in SQL, but it may be applied anywhere one has a need to build a potentially nested object (search condition in this case) which is made up of other well-formed, complex objects (predicates in this case).

Moving on, the "SQL code" editing window 38 displays the query substatements as they are built and confirmed. Confirmation occurs, e.g., by clicking on ">" button 39 with a mouse, and causes the underlying query model to be populated or updated with the new/updated query substatement as previously described.

Editing window 38 allows the user to directly modify the displayed query statement, and on completion, to update the query model. Updating is effected by clicking on "Check"

button 42 or similar means. The user also has the option of undoing his edits by clicking on "Undo Edit" button 40, or running the displayed query by clicking on "Run" button 44.

FIG. 3C is a flow chart representing typical user interactions and interface behavior to add or replace a predicate. As represented by block 81, the user first selects a column from the Column field 33. The Column field 33 is populated with the selected column as repreented in block 82. The user then selects an Operator from the Operator field 35 (block 83). In block 84, the Operator field 35 is populated with the selected operator and the area below the Operator field 35 changes. This allows the user to enter the appropriate type of information for the selected operator, as represented by the loop including block 85 and decision diamond 86.

Next, the user presses one of the center buttons to either insert or replace the predicate in the Predicate area 34 into the Search condition area as follows.

The insert buttons, "AND>" 31A and "OR>" 31B, are enabled (block 87) if the predicate in the Predicate area 34 is complete and any line is selected in the Search condition area 36. Pressing these buttons (block 88) adds two lines to the Search condition area 36 after the selected line. The first is either the logical operator AND or OR, respectively. The second line added to the Search condition area is the predicate in the Predicate area 34.

The replace button, ">" 39, is enabled (not shown) anytime a predicate is selected in the Search condition area 36 or the Search condition area 36 is blank. As represented generally in block 89, if pressed when a predicate is selected in the Search condition area 36 and the predicate in the Predicate area 34 is complete, the selected predicate in the Search condition area 36 is replaced with the predicate in the Predicate area 34. If button ">" 39 is pressed when the Search condition area 36 is blank and the predicate in the Predicate area 34 is complete, the predicate in the Predicate area 34 is added as the first predicate in the Search condition area 36. If button ">" 39 is pressed when the Search condition area 36 is blank and the predicate in the Predicate area 34 is incomplete, a message will appear indicating that the user must first complete the predicate.

Pressing the replace button ">" also causes the query model to be updated, as further indicated by block 89.

As noted above, many more user interactions can occur on this panel such as nesting, negating and removing predicates.

III. Parsing a Query

What is described next is a program algorithm for resolving column references and value expression datatypes in a parsed query language statement, an SQL statement for example. The process involves three phases: syntactic parsing, resolution of table and column references, and resolution of all other value expressions. Each phase operates on a model of the syntactic structure of the QUERY LANGUAGE statement.

A query parser can handle the syntactic aspect of parsing a query language string by using information contained in the input query string alone. However, the parser cannot handle some of the more semantic aspects of parsing without extra information that is not contained in the query language statement itself. These semantic aspects include associating column references that are contained in the query language with the tables to which the columns belong, and assigning a datatype to each value expression contained in the query language. Value expressions include column references, literal values such as 2 or 'Smith', numeric expressions such AGE +10, string expressions such as LASTNAME CONCAT ',' CONCAT FIRSTNAME, and the like.

The three phases of the process are defined as follows.

Phase 1

In the first phase, the input QUERY LANGUAGE string is syntactically parsed into an internal model form. As will be described subsequently, the model used is a tree-structured representation of the syntactic elements of the QUERY LANGUAGE statement. For example, the following QUERY LANGUAGE statement, SELECT NAME, SALARY* 0.05 FROM EMPLOYEES
can be represented in model form like this:

```
SQLQueryStatement
    SQLSelectClause
        SQLExpressionColumn (name: NAME)
        SQLExpressionCombined (operator: *)
            SQLExpressionColumn (name: SALARY)
            SQLExpressionLiteral (value: .05)
    SQLFromClause
        SQLTableReference (name: EMPLOYEES)
``` where each named item represents a syntactic element of the SQL statement. The indentation above indicates a "contains" relationship. For example, a SQLQueryStatement element contains a SQLSelectClause and a SQLFromClause, and a SQLSelectClause contains a SQLExpressionColumn and a SQLExpressionCombined and so on.

At the same time that the parser is producing this tree-structured model, it builds a simple list that contains references (or pointers) to the value expressions that it encounters. For the example after the SQL above is parsed, the value expression list contains the following elements.

SQLExpressionColumn (name: NAME)
SQLExpressionCombined (operator: *)
SQLExpressionColumn (name: SALARY)
SQLExpressionLiteral (value: 0.05)
SQLExpressionTable (name: EMPLOYEES)

Attributes of the elements are shown in parenthesis following the element name. For example, the SQLExpressionColumn element has an attribute "name" with the value "NAME".

Phase 2

In the second phase of the process, the value expressions that are of type SQLExpressionTable and SQLExpressionColumn in the expression list are semantically resolved by associating them with table (or view) and column entities in a provided information catalog. (In a typical scenario this catalog is the relational database in which the SQL statement is intended to be executed.) First, expressions of type SQLExpressionTable are matched with table entities in the catalog based on attributes of the SQLExpressionTable, such as table name and schema name (if present). Next, information about the columns belonging to each table are obtained from the catalog. This information includes not only the column names, but their datatypes as well (such as INTEGER and VARCHAR). Then, using the column name attribute of the SQLExpressionColumn objects, the SQLExpressionColumns are associated with their corresponding table and column entities in the catalog. This enables datatypes to be assigned to each SQLExpressionColumn. For example, in the query above, after phase 2 the column expression objects in the model (and in the expression list) have been updated to become:

SQLExpressionColumn (name: NAME, table: EMPLOYEES, datatype: VARCHAR(20))
SQLExpressionColumn (name: SALARY, table: EMPLOYEES, datatype: DECIMAL(7, 2))

Phase 3

In the third phase, all remaining value expressions in the expression list are resolved as to their datatype. The technique used to do this varies depending on the kind of value expression and on the type of query structure that contains it. Here are illustrations of the processing required in this phase for several types of value expression.

SQLExpressionLiteral: the datatype is determined by inspecting the value directly. For example a simple numeric value becomes INTEGER. A decimal value gets the datatype DECIMAL(precision, scale) where the precision and scale are determined by length of the decimal value and the location of the decimal point. A quoted string value gets datatype VARCHAR(length) where the length is the length of the value inside the quotes.

SQLExpressionCombined: the datatype is determined by recursively examining the left and right side components of the expression object to find a value expression whose datatype has already been resolved, and using that datatype for the datatype of the SQLExpressionCombined object as a whole. For example, if the SQLExpressionCombined encompasses "SALARY*0.05", the datatype of the expression can be determined by looking at the left side, which contains a SQLExpressionColumn object (SALARY) whose datatype (DECIMAL) is known. The semantic check that the two sides of a combined expression are "combinable" datatypes can be done at the same time.

SQLExpressionFunction: The method for determining the datatype of a SQL function object varies depending on the particular function involved. For some functions, the datatype is simply the return datatype defined for the function (such as the return type INTEGER for the cast function INTEGER( )). For other functions, the datatype of the function depends on the datatype of its arguments. (For example, the function MAX takes on the datatype of its argument. The datatype of MAX(SALARY) is DECIMAL, while the datatype of MAX(AGE) would be INTEGER.)

Resolving the datatypes of all the value expressions may take several passes through the value expression list. For the query given above, the expression list at the end of phase 3 might look like this:

SQLExpressionColumn (name: NAME, table: EMPLOYEES, datatype: VARCHAR(20))
SQLExpressionCombined (operator: *, datatype DECIMAL(7, 2))
SQLExpressionColumn (name: SALARY, table: EMPLOYEES, datatype: DECIMAL(7, 2))
SQLExpressionLiteral (value: 0.05, datatype DECIMAL (2, 2))
SQLExpressionTable (name: EMPLOYEES)

IV. Model Content Provider

Figure 4:
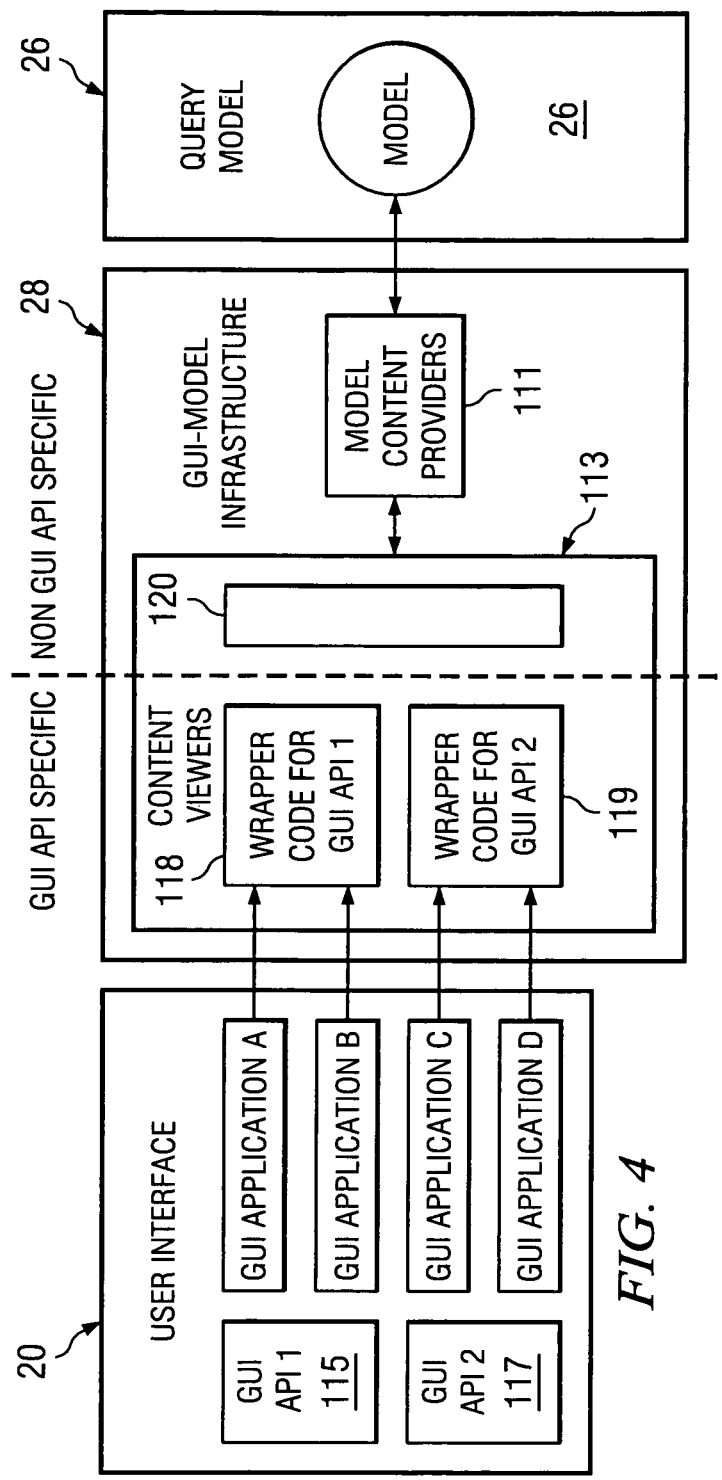
FIG. 4 is a block diagram representing the model content provider of the present invention.

The GUI Model Infrastructure (GMI) of the present invention is shown in FIG. 4. It is preferably a software architecture represented by functional block 28 and resides between the user interface 20 and the query model 26.

More specifically, user interface 20 is shown to include a plurality of GUI API's, GUI API1 and GUI API2. GUI Applications A, B, C and D run on the user interface and are written to a specific GUI API. For example, as shown, GUI applications A and B are written to run on GUI API1. Similarly, GUI applications C and D are written to a different GUI API2.

The GMI 28 includes Model Content Providers (MCP) 111, which translate Query Model (QM) 26 information into collections of information that are independent of structure type. The MCP interfaces with Content Viewers 113 (CV's 118, 119, 120) which take the MCP collections and manipulate the collections for specific structures such as tables, trees, lists, etc. The CV's 113 are a hierarchical set of classes, from the more abstract structures 120 at the top, to the GUI-specific structures 118, 119 at the bottom.

The Non GUI API specific components of the GMI 28 reside to the right of the dashed line and are created w/o regard to which GUI API will be used. The beauty of this architecture is that the non-specific CV's 113 are reusable, API-independent components. Thus, they provide scalability to diverse, subsequently added GUI API's.

In contrast, the GUI-specific CV's 118, 119 to the left are written specifically to the GUI API they communicate with. In the present FIG. 4, CV 118 comprises wrapper code for API 1, and CV 119 comprises wrapper code for API 2. Each GUI Application A, B, C and D interfaces with a GUI-specific CV 118, 119, informing the CVs about user actions. This approach enables any new GUI application using the same GUI API to reuse the same wrapper code. A new GUI application using a different GUI API can write its own wrapper code and still reuse the common, more abstract, GUI API independent Content Viewers 120.

Stepping back for a moment, the content viewers 113 of the present invention are defined by a hierarchical set of classes. Previously, content viewers were designed for a single GUI API as might be represented by blocks 118 and 120.

Due to the lower levels of this hierarchy being GUI API specific, and the higher levels of the hierarchy being non GUI specific, the designers were able to clearly divide the Content Viewers 113 into reusable and non reusable components able to support multiple API's. Lower level GUI API specific classes were rewritten to enable reuse of the higher levels of the Content Viewer classes as well as the tightly coupled Model Content Providers.

The Model Content Provider 111 of the present invention performs several functions. It creates objects, called item providers, that are instances of the model elements representing the current SQL Statement. These objects are created dynamically as the user builds the statement. The query model relationships (e.g. hierarchy, dependencies, etc.) that the Query Model 26 contains are also contained in the item provider objects. Thus, for a specific statement, its "model" is actually a set of item provider objects whose relationships are dictated by the overall Query Model 26.

MCP 111 obtains information from the Query Model 26 and translates this information into data for use by Content Viewers. The higher layers of the Content Viewers, block 120, passes on this data to lower layer viewers (blocks 118 or 119). It receives information from the GUI applications via the Content Viewers, independent of the specific structure (e.g. table, tree, list, etc) of the data.

In addition, MCP 111 is able to discern if the information it gets from the viewers is an addition, a modification, or a deletion of any element in the current model. In the case of an addition, the MCP is able to discern if additional model elements need to be created. It has a "factory" class that takes care of creating additional item providers corresponding to these new model elements. For example, the GUI application gave a request to add a table to the query. One of the content viewers passes this information to the MCP 111. The MCP 111 is aware that it will need to get the "children" of this model element, so it calls on its "factory" class to create the children of this particular model element, a table, which happen to be the columns of the table. Once these elements are created and properly linked in the Query Model 26, the MCP instructs the Content Viewers to refresh the information that they have. Only the Content Viewers affected by the addition of the table, will be refreshed. Once refreshed, the Content Viewers will inform the GUI application to update what is displayed to the user.

Similarly, in the case of a deletion, when a model element that has children is deleted, the Content Viewers send the request to delete this element to the MCP 111. The MCP 111 takes care of determining where the child elements are linked to in the entire query model and performs the removal of these objects from the Query Model 26. Again, when the deletions are complete, the MCP 111 informs the Content Viewers 113 to refresh themselves.

The MCP provides both data and image information to the viewers. Special classes, called label provider classes contain text and image information and are tied to specific model elements of the query. This allows for easy translation of labels or revision of icons.

To save an existing query, the Query Assist tool of the present invention provides a set of hierarchical models for storing the query elements, as will be described subsequently.

V. The Query Model

The query model of the present invention is designed with the actual syntax of the query language in mind, mirroring each element of the query statement and its relationships to the other elements. Since a number of dialects of a query language such as SQL may be in use, the model is optionally designed to reflect syntax common for multiple dialects. Further, it provides a more detailed representation of query components than is currently available. To this end, detailed representations of various query components are provided.

Figure 5:
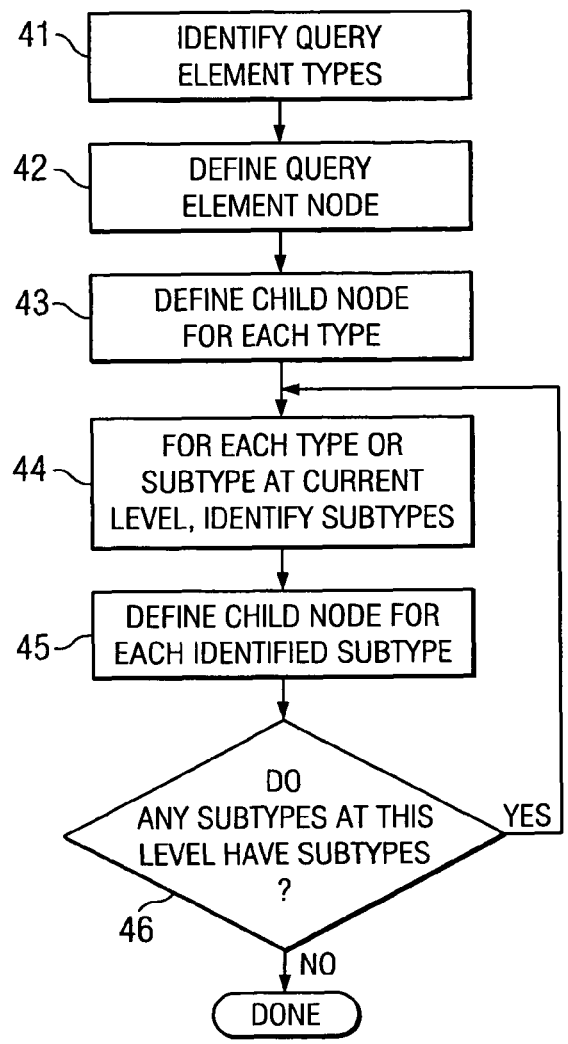
FIG. 5 is a flow diagram illustrating the steps for modeling a query according to the present invention.

FIG. 5 is a flow diagram illustrating the steps for modeling elements of a query according to the present invention The present invention provides both a modeling methodology and examples of actual models produced using the described methodology. Once a query element has been selected for modeling, the steps outlined in FIG. 5 are followed to create a tree structure representative of that element. In a first step 41, at least one type associated with the query element is identified. Next, a "parent" node representing the element is defined in step 42, and in step 43, a "child" node is defined for each identified type. Thereafter, each child node is examined in step 44 to determine if it has any subtypes, and if so, a child node of that node is defined for each determined subtype in step 45. This process may continue for as many levels of the tree structure that the modeler desires. By proceeding until no further subtypes remain, as represented by the loop including steps 44 and 45 and decision diamond 46, a highly granular query model is obtained.

FIGS. 6A-10 provide examples of actual model representations of various elements of a query.

A. Combined Structures to Represent Query Elements

A first challenge to the modeler is to completely and accurately depict the iterative and nesting capabilities of the query language. In particular, a query statement may contain a complex query expression that includes an atomic query element "AQE", i.e., noniterative and unnested query element. It may further include a combined operator "CO". The CQE includes right and left subelements related by a combined element operator. These subelements may in turn be either AQE's or CQE's, and furthermore, the structure of a CQE is shown below:

CQE=((LQE CO RQE)

where LQE is the left query element, RQE is the right query element, CO is a combined operator such as AND/OR, and where LQE and RQE can either be atomic or combined query elements.

Previous models have often been simplistic and inefficient at representing such expressions, and have therefore been of limited usefulness. This present invention provides a representation that succinctly and accurately reflects the true picture of both the data and underlying structure of the query language.

Figure 6A:
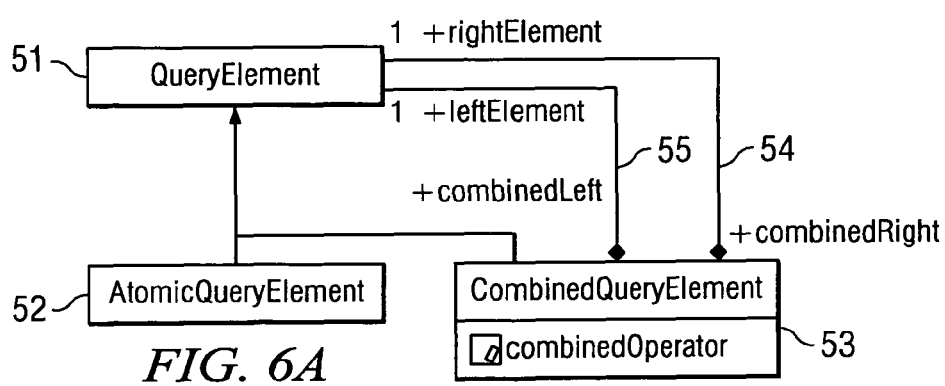
FIGS. 6A and 6B illustrate a combined structure for modeling complex queries including an atomic element and a combined query element according to an aspect of the present invention.

Accordingly, the present invention provides a "Combined Structure" model as shown in FIG. 6A to represent complex query. The structure includes an abstract "superclass" shown as parent node 51 and first and second classes 52, 53 to represent, respectively, the atomic and combined query elements.

As an example, consider the following query:

```
SELECT DEPARTMENT.DEPTNAME, EMPLOYEE.LASTNAME
    FROM DEPARTMENT, EMPLOYEE
    WHERE
        DEPARTMENT.DEPTNO IN ('D01', 'D11', 'D21') AND
        (EMPLOYEE.SALARY > 50000 OR
        EMPLOYEE.JOB = 'MANAGER')
```

We will use the above example to map a query into an instance of the model structure shown in FIG. 6A. The statement "WHERE DEPARTMENT.DEPTNO IN ('D01', 'D11', 'D21') AND (EMPLOYEE.SALARY>50000 OR EMPLOYEE.JOB='MANAGER'," is the query element to be modeled and will be represented by an instance of parent node 51. The clause "DEPARTMENT.DEPTNO IN ('D01', 'D11', D'21') is an atomic query element or subclass (AQE) and is represented by an instance of node 52. The clause "(EMPLOYEE.SALARY>50000 OR EMPLOYEE.JOB='MANAGER')" is an example of a combined query element or subclass (CQE) within that statement and is represented by an instance of node 53. The atomic and combined query elements are related by a combined operator (CO), in this instance "AND". Thus, the query element to be modeled may be represented as:

WHERE $CQE_1$ $CQE_1$ has the following internal structure:

$AQE_1$ $CO_1$ $CQE_2$

As previously noted, the combined query element's subelements (LQE and RQE, above) may in turn be either AQE's or CQE's. In the present example, the subelements of $CQE_2$ are "EMPLOYEE.SALARY>50000" and "EMPLOYEE.JOB='MANAGER' which can be represented as $AQE_2$ and $AQE_3$, respectively, and are related by another combined operator "OR". Accordingly, the present example may further be represented as:

WHERE $AQE_1$ $CO_1$ ($AQE_2$ $CO_2$ $AQE_3$)

Figure 6B:
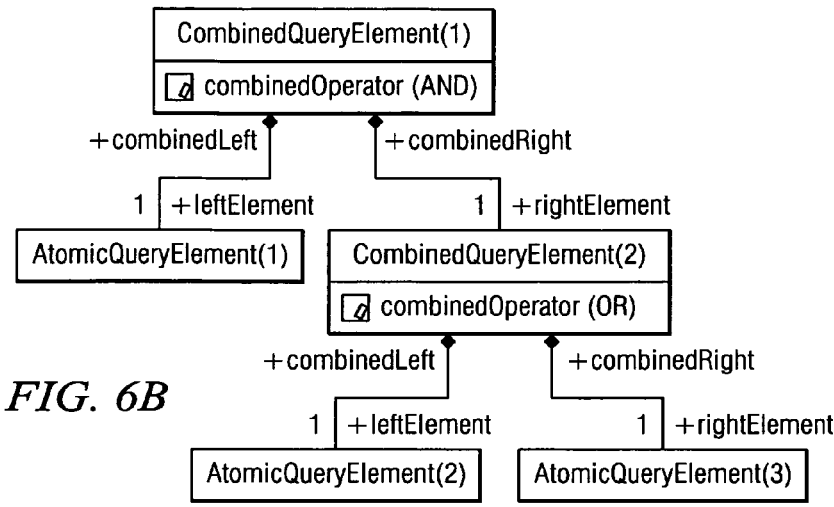

The representation of the example query above is depicted in FIG. 6B.

According to the present invention, the generalized combined structure of FIG. 6A may be used at any level of the model's hierarchy to represent the existence of an atomic subclass and a combined query related by a query operator element. The iterative nature of this structure thus provides a simple and intuitive representation of what in the past has been considered a very complex query structure.

B. Representing Predicates

Figure 7A:
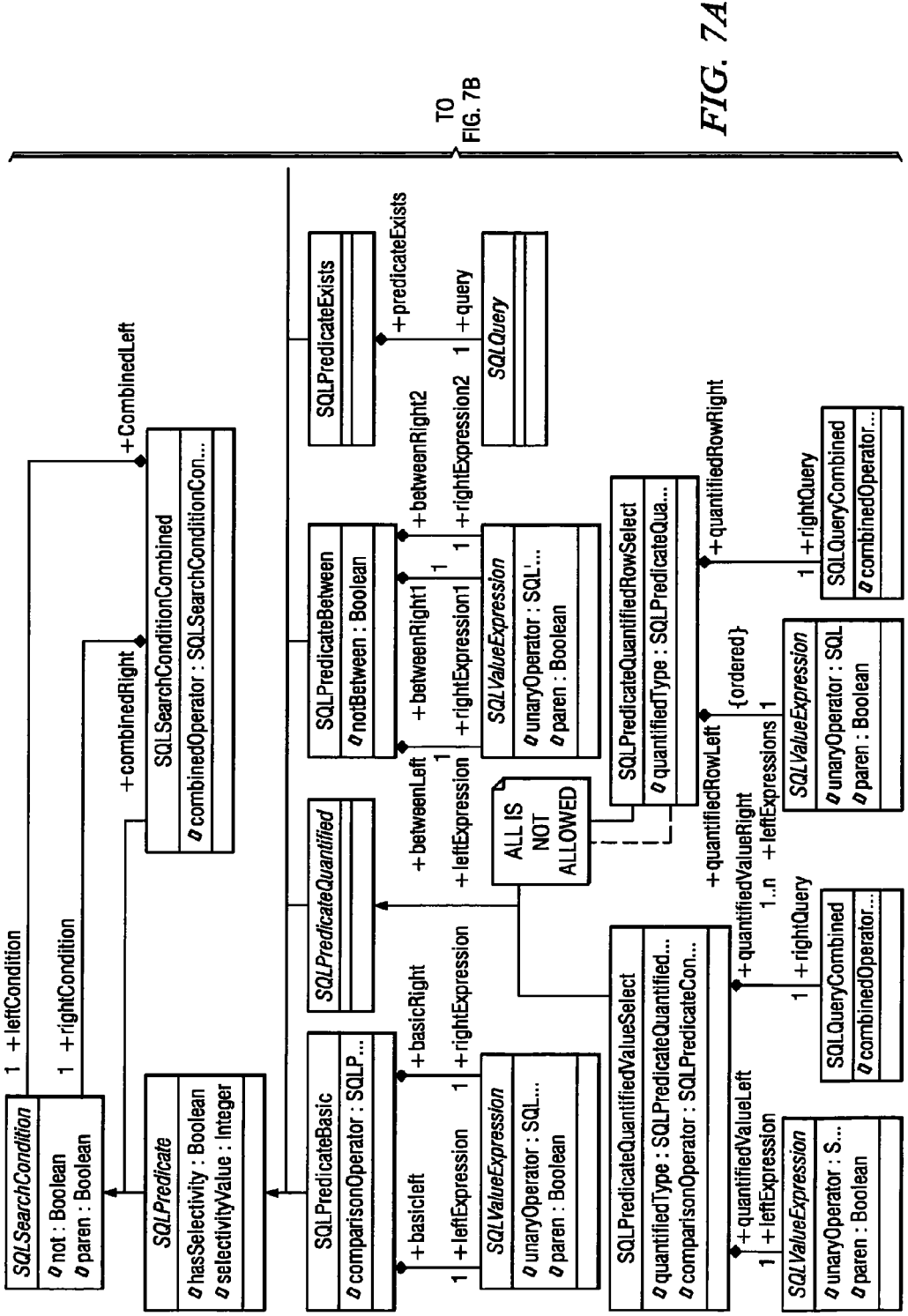
Figure 7B:
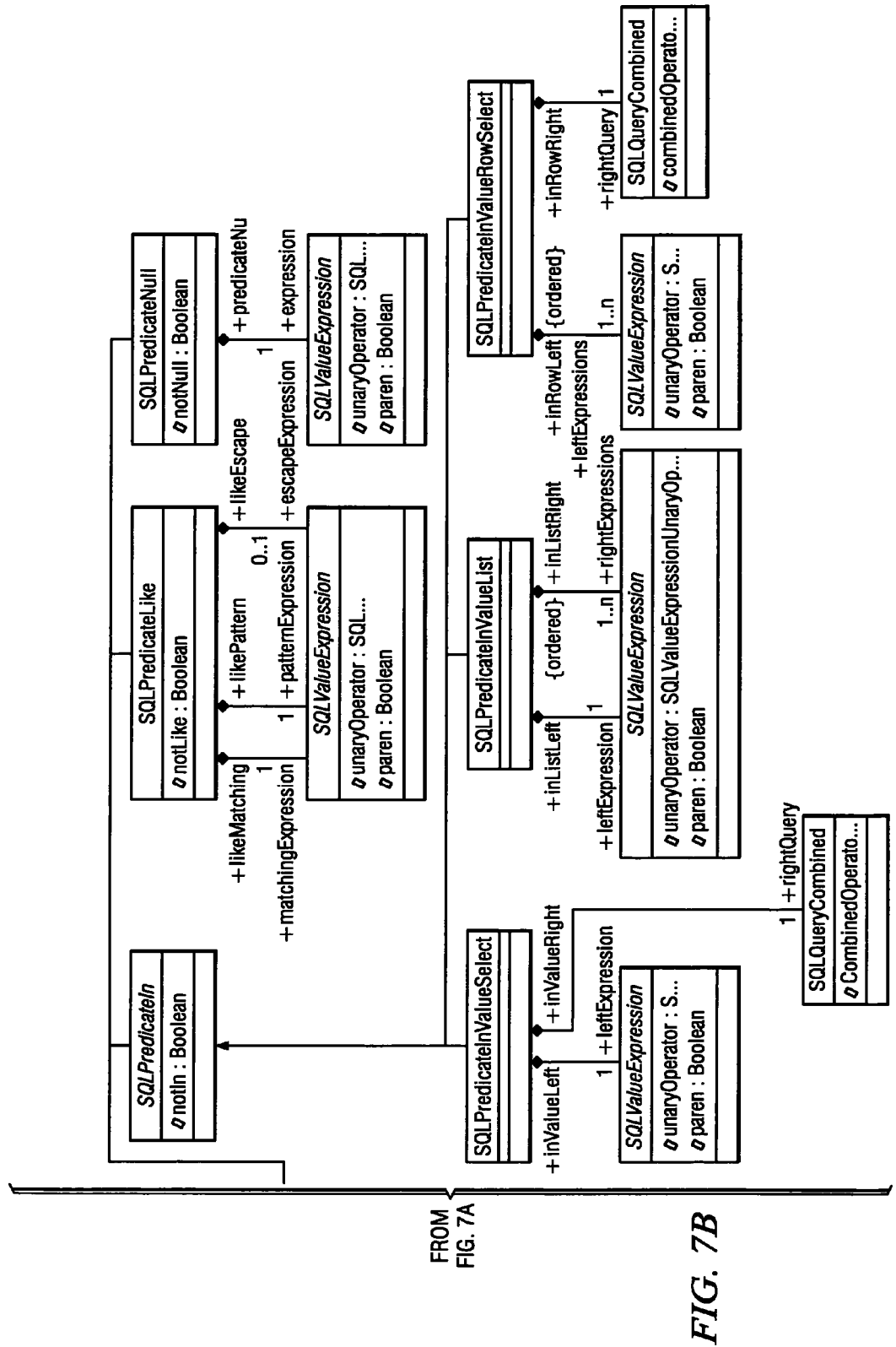

FIG. 7 is an exemplary query model representation of a predicate. It includes numerous aspects of a predicate statement, and consistent with the modeling methodology of the present invention, takes into account multiple SQL dialects and proper syntax.

C. Representing Table References

Figure 8:
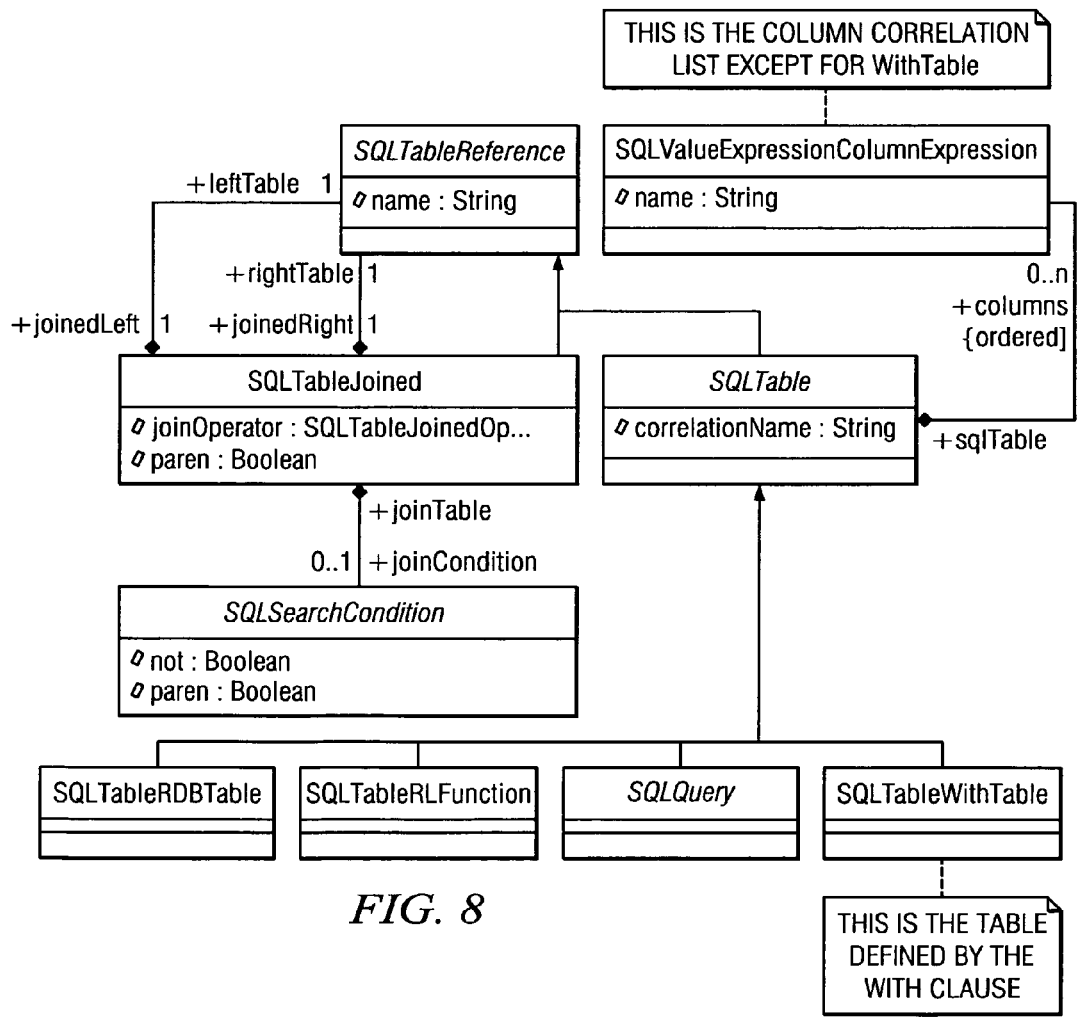
FIGS. 7 to 10 illustrate model representations of various complex query elements using the combined structure of FIGS. 6A and 6B.

FIG. 8 is an exemplary query model representation of a table reference. It clearly represents all desired aspects of the table reference query element. And consistent with the modeling methodology of the present invention, it takes into account multiple SQL dialects and proper syntax.

D. Representing Value Expressions

Figure 9A:
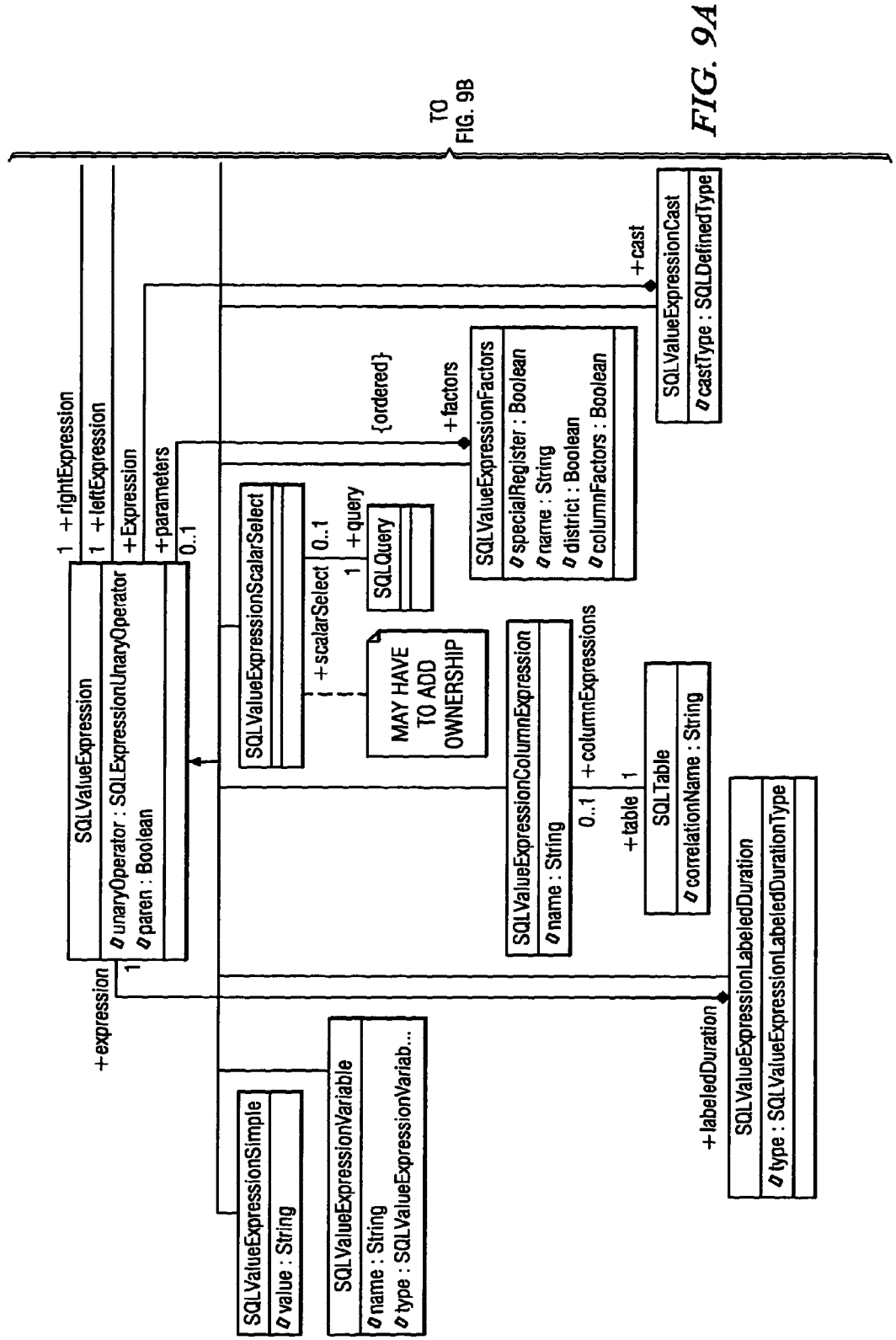
Figure 9B:
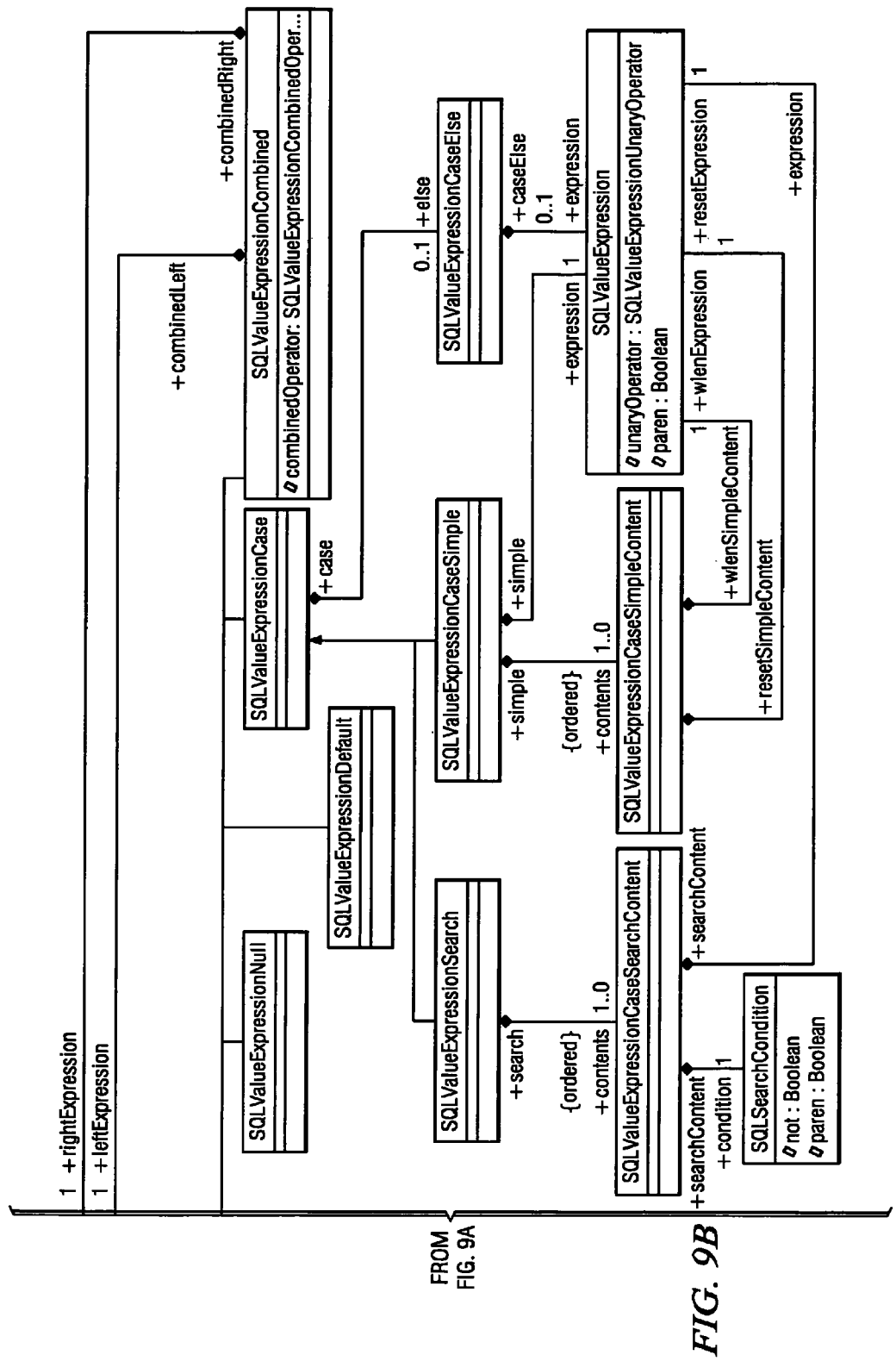

FIG. 9 is an exemplary query model representation of a value expression. It includes all desired aspects of the value expression query element and takes into account multiple SQL dialects and proper syntax.

E. Representing Group-By

Figure 10:
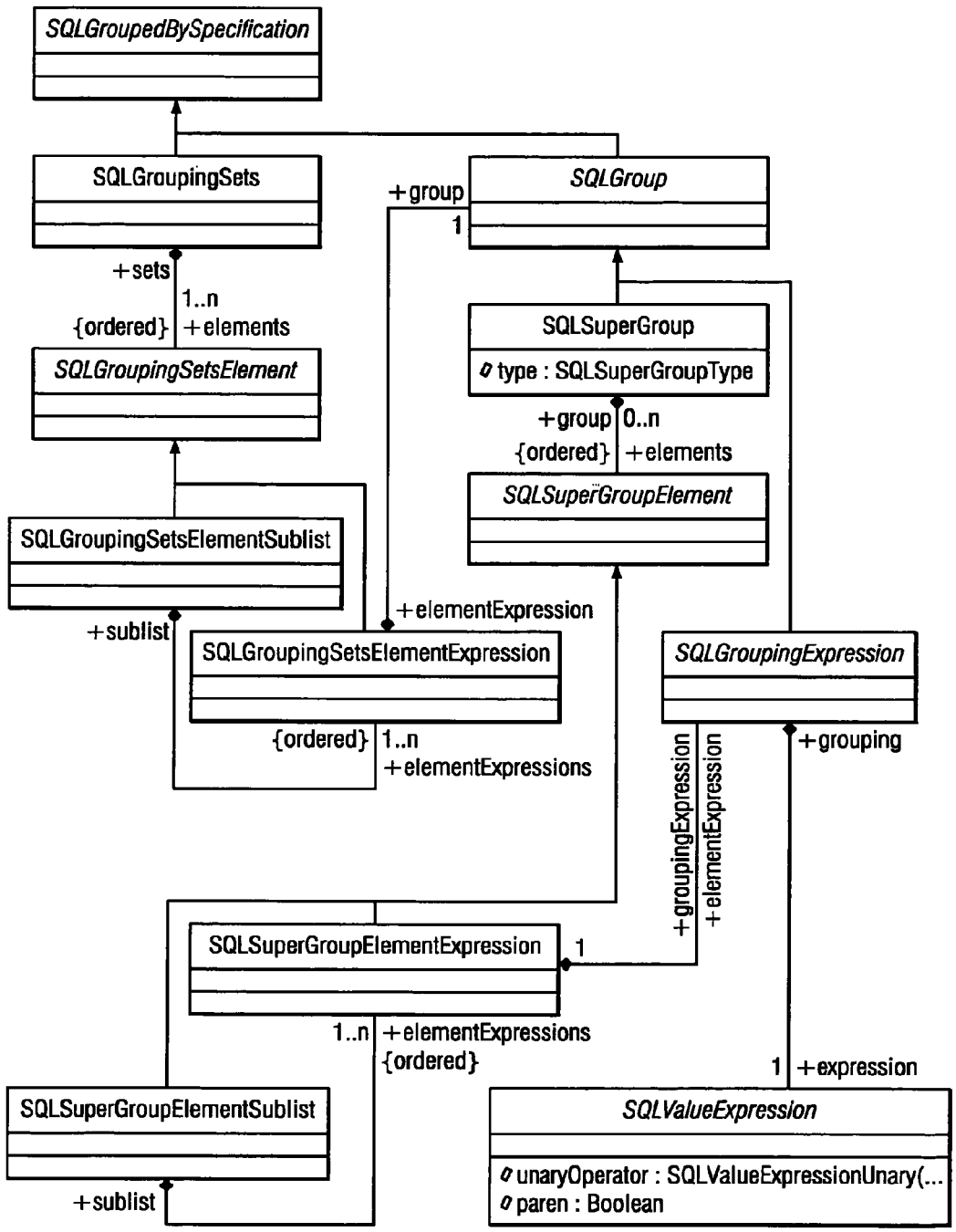

FIG. 10 is an exemplary query model representation of a group-by statement. It includes numerous aspects of the Group By query option, including advanced features. And consistent with the modeling methodology of the present invention, it also takes into account multiple SQL dialects and proper syntax.

F. Generating a Query Language Element from the Query Model Inclusive of its Children An advantage of the top-down modeling approach of the present invention is the ability to recreate any query language element such as a clause or substatement of the query downward, not just at the root level. That is, a call can be made to a particular subnode, and as a result of the call the subnode and its children return a reconstructed query language element representing the value of the subnode and its children.

As an example, consider the following select statement:

SELECT NAME, DEPT, SALARY+BONUS FROM EMPLOYEES

Figure 11:
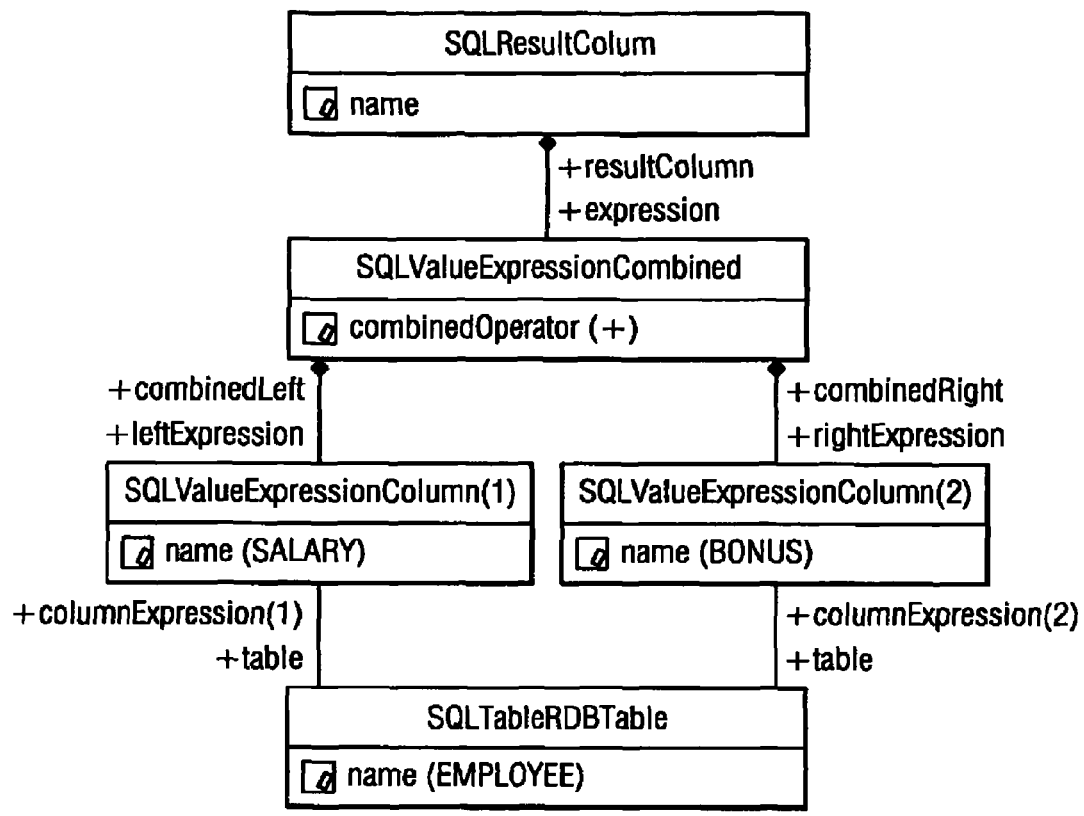
FIG. 11 is a representation of a query sub-statement populating an instance the model according to the present invention.

A call may be made to the subnode of the model that represents the third result column of the select clause of the query and as a result, the "SALARY+BONUS" query language element would be reconstructed and returned. The portion of the model instance that represents the third result column is shown in FIG. 11. A call to the model element or node representing SQLResult returns the query statement for that element of the statement, i.e., the query element and all of its children.

G. Maintaining Model Independence Within a Larger Collection of Models

Applications may involve multiple models which may have a domain different from the one described above. This can be a problem when there are dependencies between models so that even minor changes to one model can affect the other models and require updating to the latter. More specifically, in a typical code generating environment, when models used to generate code have dependencies between them, then modifying one model requires code to be regenerated for all the related models.

The present invention helps to overcome this problem by providing a greater degree of independence among models. Within the code-generating environment, dependencies between models are removed such that changes to one model do not force the regeneration of code by other models.

This is achieved by adding proxy objects to a model to replace references to other models, and then reestablishing the references amongst the models after the code generation step.

Figure 12:
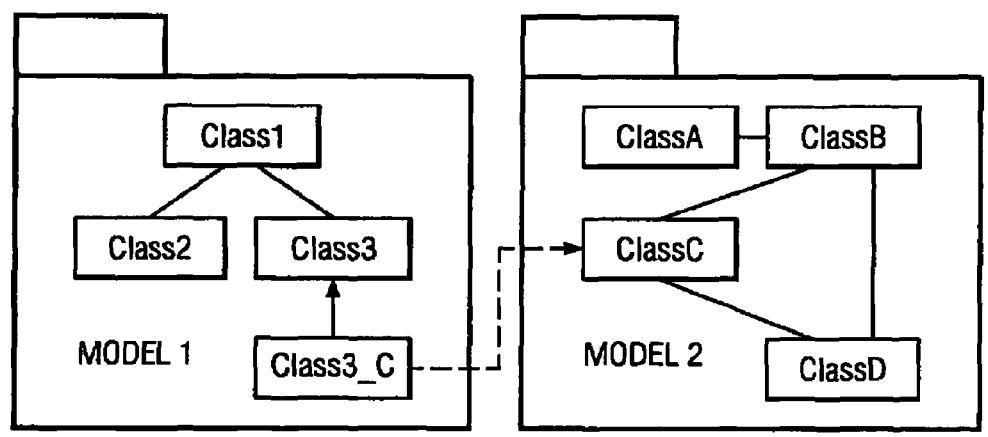
FIG. 12 is a block diagram representing an approach for removing dependencies among models created in different domains.

An example is illustrated in FIG. 12. Model 1 needs to reference an element of model 2 ("ClassC"). Instead of creating a reference directly from Model 1 to ClassC in Model 2, an extra element Class3_C is added to Model 1 that tales the place of ClassC. Therefore all references are contained within Model 1. After code is generated from the models, the generated code is modified to connect element Class3_C and ClassC. This is shown with the dotted line in FIG. 12.

Although the present invention has been described with reference to a specific embodiment, various substitutions and modifications may occur to the developer in implementing the invention without departing from its spirit and scope. Accordingly, the invention is not to be limited by the specification set forth, but is to be accorded its broadest interpretation as claimed, below.

What is claimed is:

1. A computer-implemented system for assisting a user in creating and/or editing a query statement, the computer-implemented system comprising:
   means for visually displaying a search condition of a query statement in a first display area;
   means for visually selecting two or more predicates of the displayed search condition for grouping;
   means for resolving column references and value expression datatypes in the query statement comprising:
      syntactic parsing of an input into an internal model form,
      semantic resolving of SQL expression tables and columns by associating the SQL expression tables and columns with table and column entities provided in an information catalog, and
      resolving remaining value expression datatypes; and
   means responsive to selection of the two or more predicates for visually indicating the grouping in the first display area.

2. The computer-implemented system of claim 1, wherein the selecting means further comprises means for highlighting the two or more predicates.

3. The computer-implemented system of claim 2, further comprising means for selecting one or more of grouped predicates for ungrouping.

4. The computer-implemented system of claim 3, further comprising means, responsive to grouped predicate selection, for removing the indications of grouping from the first display area.

5. The computer-implemented system of claim 3, further comprising means for confirming selection of the one or more grouped predicates for ungrouping.

6. The computer-implemented system of claim 5, further comprising means responsive to selection confirmation for removing the indications of the grouping from the first display area.

7. The computer-implemented system of claim 5, wherein the confirming means further comprises one or more of the group comprising: a selectable button displayed in a second display area, a mouse click, a keystroke, and the equivalent of any of the foregoing.

8. The computer-implemented system of claim 5, wherein activation of the confirming means causes a model instance to be updated with the selected ungrouping.

9. The computer-implemented system of claim 1, further comprising means for confirming selection of the two or more predicates for grouping.

10. The computer-implemented system of claim 9, wherein the confirming means further comprises one or more of the group comprising: a selectable button displayed in a second display area, a mouse click, a keystroke, and the equivalent of any of the foregoing.

11. The computer-implemented system of claim 9, wherein activation of the confirming means causes a model instance to be updated with the selected grouping.

12. The computer-implemented system of claim 1, wherein the means for indicating the grouping further comprises at least one of the following:
   indenting the grouped predicates relative to other predicates of the search condition;
   positioning the grouped predicates adjacent to each other; and delineating the group with parenthesis or an equivalent symbol, wherein an order in which the group is evaluated is controlled in a designated manner.

13. The computer-implemented system of claim 1, wherein the means for displaying the search condition further comprises means for displaying each search predicate in a separate line of the first display area.

14. The computer-implemented system of claim 1, wherein displaying the search condition further comprises means for displaying each operator in a separate line of the first display area.

15. The computer-implemented system of claim 1, wherein the interface is further coupled to an application interface for receiving a query statement from an application for populating the interface.

16. The computer-implemented system of claim 1, further comprising:
means for displaying at least a portion of the query statement in a second display area.

17. A computer-implemented method for assisting a user in creating and/or editing a query statement, wherein the computer performs the following functions comprising:
visually displaying a search condition of a query statement in a first display area of the user interface;
visually selecting two or more predicates of the displayed search condition for grouping;
visually resolving column references and value expression datatypes in the query statement comprising:
syntactic parsing of an input into an internal model form,
semantic resolving of SQL expression tables and columns by associating the SQL expression tables and columns with table and column entities provided in an information catalog, and
resolving remaining value expression datatypes; and
visually indicating the grouping in the first display area in response to selection of the two or more predicates.

18. The computer-implemented method of claim 17, wherein the selecting step further comprises the step of highlighting the two or more predicates.

19. The computer-implemented method of claim 18, further comprising the step of selecting one or grouped predicates for ungrouping.

20. The computer-implemented method of claim 19, further comprising the step of means removing the indications of grouping from the first display area in response to the step of selecting grouped predicates.

21. The computer-implemented method of claim 19, further comprising the step of confirming selection of the one or more grouped predicates for ungrouping.

22. The computer-implemented method of claim 21, further comprising the step of removing the indications of the grouping from the first display area in response to selection confirmation.

23. The computer-implemented method of claim 21, wherein the confirming step comprises one or more of the group comprising: selecting a confirmation button displayed in a second display area, entering a mouse click, entering a keystroke, and the equivalent of any of the foregoing.

24. The method of claim computer-implemented 21, where confirmation causes a model instance to be updated with the selected ungrouping.

25. The computer-implemented method of claim 17, further comprising the step of confirming selection of the two or more predicates for grouping.

26. The computer-implemented method of claim 25, wherein the confirming step further comprises one or more of the group comprising: selecting a confirmation button displayed in a second display area, entering a mouse click, entering a keystroke, and the equivalent of any of the foregoing.

27. The computer-implemented method of claim 25, where confirmation causes a model instance to be updated with the selected grouping.

28. The computer-implemented method of claim 17, wherein the step of indicating the grouping further comprises at least one of the following:
indenting the grouped predicates relative to other predicates of the search condition;
positioning the grouped predicates adjacent to each other; and
delineating the group with parenthesis or an equivalent symbol, wherein an order in which the group is evaluated is controlled in a designated manner.

29. The computer-implemented method of claim 17, wherein the step of displaying the search condition further comprises the step of displaying each search predicate in a separate line of the first display area.

30. The computer-implemented method of claim 17, wherein the step of displaying the search condition further comprises the step of displaying each operator in a separate line first display area.

31. The computer-implemented method of claim 17, further comprising the step of receiving a query statement from an application for populating the interface.

32. The computer-implemented method of claim 17, further comprising:
displaying at least a portion of the query statement in a second display area.

33. A non-transitory computer storage medium readable by a computer and embodying one or more instructions executable by the computer, the computer program providing a query assist tool for assisting a user in creating and/or editing a query statement and further comprising:
program instructions for visually displaying a search condition of a query statement in a first display area of the user interface; and
program instructions for visually selecting two or more predicates of the displayed search condition for grouping;
program instructions for visually resolving column references and value expression datatypes in the query statement comprising:
syntactic parsing of an input into an internal model form,
semantic resolving of SQL expression tables and columns by associating the SQL expression tables and columns with table and column entities provided in an information catalog, and
resolving remaining value expression datatypes; and
program instructions for visually indicating the grouping in the first display area in response to selection of the two or more predicates.

34. The non-transitory computer storage medium of manufacture of claim 33, wherein the program instructions for selecting further comprises program instructions for highlighting the two or more predicates.

35. The non-transitory computer storage medium of manufacture of claim 34, further comprising program instructions for selecting one or more of grouped predicates for ungrouping.

36. The non-transitory computer storage medium of manufacture of claim 35, further comprising program instructions for removing the indications of grouping from the first display area in response to the step of selecting grouped predicates.

37. The non-transitory computer storage medium of manufacture of claim 35, further comprising program instructions for confirming selection of the one or more grouped predicates for ungrouping.

38. The non-transitory computer storage medium of manufacture of claim 37, further comprising program instructions for removing the indications of the grouping for the first display are in response to selection confirmation.

39. The non-transitory computer storage medium of manufacture of claims 37, wherein the program instructions for confirming further comprise program instructions for one or more of the group comprising: selecting a confirmation button displayed in a second display area, entering a mouse click, entering a keystroke, and the equivalent of any of the foregoing.

40. The non-transitory computer storage medium of manufacture of claim 37, further comprising program instructions for updating a model instance with the selected ungrouping upon confirmation.

41. The non-transitory computer storage medium of manufacture of claim 33, further comprising program instructions for confirming selection of the two or more predicates for grouping.

42. The non-transitory computer storage medium of manufacture of claim 41, wherein the program instructions for confirming further comprise program instructions for one or more of the group comprising: selecting a confirmation button displayed in a second display area, entering a mouse click, entering a keystroke, and the equivalent of any of the foregoing.

43. The non-transitory computer storage medium of manufacture of claim 41, further comprise program instructions for causing a model instance to be updated with the selected grouping upon confirmation.

44. The non-transitory computer storage medium of manufacture of claim 33, wherein the program instructions for indicating the grouping further comprises at least one of the following:

- indenting the grouped predicates relative to other predicates of the search condition;
- positioning the grouped predicates adjacent to each other; and
- delineating the group with parenthesis or an equivalent symbol, wherein an order in which the group is evaluated is controlled in a designated manner.

45. The non-transitory computer storage medium of manufacture of claim 33, wherein the program instructions for displaying the search condition further comprise program instructions for displaying each search predicate in a separate line of the first display area.

46. The non-transitory computer storage medium of manufacture of claim 33, wherein the program instructions for displaying the search condition further comprise program instructions for displaying each operator in a separate line of the first display area.

47. The non-transitory computer storage medium of manufacture of claim 33, further comprising program instructions for receiving a query statement from an application for populating the interface.

48. The non-transitory computer storage medium of manufacture of claim 33, further comprising:

program instructions for displaying at least a portion of the query statement in a second display area.

* * * * *